United States Patent [19]

Hanada

[11] Patent Number: 5,229,877
[45] Date of Patent: Jul. 20, 1993

[54] METHOD OF CONTROLLING SIZE OF LIGHT BEAM

[75] Inventor: Koji Hanada, Tokyo, Japan

[73] Assignee: Toyo Ink Manufacturing Co., Ltd., Tokyo, Japan

[21] Appl. No.: 782,967

[22] Filed: Oct. 25, 1991

[30] Foreign Application Priority Data

Oct. 26, 1990 [JP] Japan .................. 2-290212

[51] Int. Cl.$^5$ .............................................. G02B 26/02
[52] U.S. Cl. .................................. 359/236; 359/232; 359/234
[58] Field of Search ............... 359/227, 232, 234, 235, 359/236; 362/738, 889, 321; 354/226, 266

[56] References Cited

U.S. PATENT DOCUMENTS 3,427,093  2/1969  Strass et al. .................. 359/236

Primary Examiner—Bruce Y. Arnold
Assistant Examiner—James Phan
Attorney, Agent, or Firm—Wenderoth, Lind & Ponack

[57] ABSTRACT

A method of controlling a size of a light beam, which comprises rotating a disk having a groove whose size changes continuously or a polygonal-shaped rotor having grooves of different sizes, on the circumferential surface, and irradiating the groove or grooves with a light beam, whereby the groove or grooves provide a transmitted light beam having a size that change continuously or stepwise, respectively, while retaining an analogous form of the light beam.

10 Claims, 5 Drawing Sheets

FIG.13 FIG.14
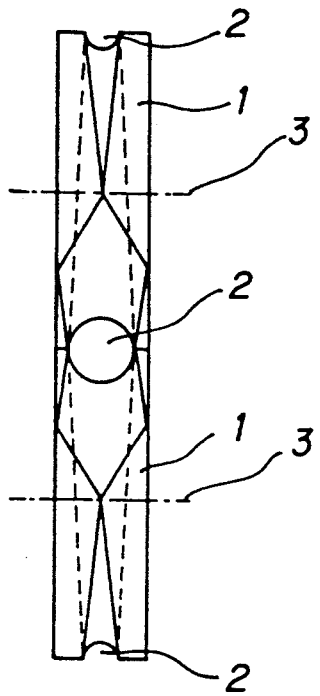
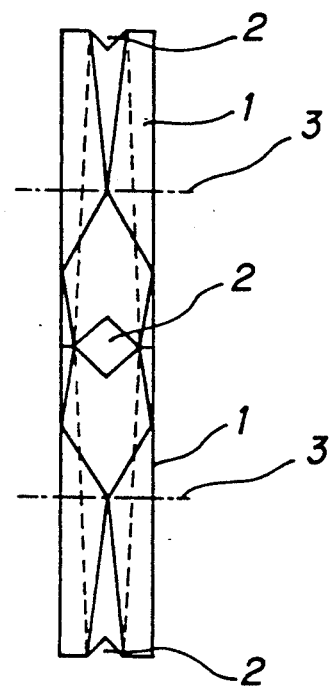
FIG.15
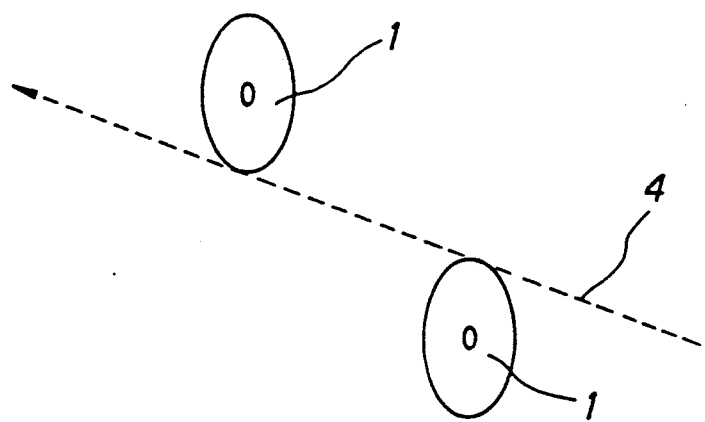

METHOD OF CONTROLLING SIZE OF LIGHT BEAM

FIELD OF THE INVENTION

The present invention relates to a method of writing or outputting digital image data with a light beam. In particular, it relates to a method of changing the size of a light beam continuously at a high velocity while retaining its analogous form.

PRIOR ART OF THE INVENTION

In the fields of printing plates, laser beams and printers, there have been recently used a method of writing digital image data and a device to which such a method is applied.

In the field of printing plates, a dot printing method has been conventionally known as a method of reproducing a half tone image (gradation expression), and gives an image closest to a natural tone expression of full color. Various techniques have been developed as means of forming dots. For example, there are available a method using a contact screen, a method using a dot generator, and the like.

As a method of reproducing or writing halftone image data with a light beam, used in a laser beam printer, etc., there have been proposed a number of methods such as an ordered dither method, a density pattern method, an error diffusion method, etc.

In the means of reproducing or writing digital image data with a light beam, used in printing plates and laser beam printers, in general, the size of the light beam is constant and used as one element, and a matrix consisting of n×n elements as a group is used as a pixel. Therefore, one pixel can have $(n^2+1)$ density patterns, which is all that one pixel can represent. Since the light beam size is constant, the gradation expression has its own limit.

In order to increase intermediate tones in expression, it is required to increase the number of pixel elements. If, however, the number is increased, the size of the pixel increases due to the constant size of a light beam which constitutes a pixel element, and the fineness of the resultant image in expression is impaired.

The above problem on the fineness in expression can be overcome by decreasing the size of a light beam. However, with a decrease in the size of a light beam, the number of scanning lines increases. As a result, it is required to increase the position control accuracy, increase the amount of data which can be processed or increase the sensitivity of an object to be written. For this reason, when the above method of decreasing the size of a light beam is applied to commercial devices such as a light beam-applied laser beam printer, a full color copying machine, etc., the resultant devices are not practical.

Under the above circumstances, there has been proposed a method of changing the size of a light beam with an iris diaphragm or a liquid crystal diaphragm as is described in JP-A-61-113018. The problem with this method is that the control for changing the size of a light beam takes time. For example, when this method is applied to a laser beam printer or a full color copying machine, the writing rate is very low, and a device using this method has not yet been put to practical use.

SUMMARY OF THE INVENTION

It is an object of the present invention to provide a method of controlling the size of a light beam, which is suitable for a device for writing image data, character data, etc., with a light beam.

It is another object of the present invention to provide a method of controlling the size of a light beam continuously or stepwise while retaining the light beam form analogously.

It is further another object of the present invention to provide a method of controlling the size of a light beam for forming a dot with the light beam per se.

It is still further another object of the present invention to provide a method of controlling the size of a light beam, in which a light beam which can form a dot can be outputted for every dot.

Further, it is another object of the present invention to provide a method of controlling the size of a light beam, which permits excellent gradation expression with a full color copying machine, etc.

According to the present invention, there is provided a method of controlling the size of a light beam, which comprises rotating a disk having a groove whose size changes continuously, or a polygonal-shaped rotor having grooves of different sizes, on the circumferential surface, and irradiating the groove or grooves with a light beam, whereby the groove or grooves provide a transmitted light beam having a size that changes continuously or stepwise, respectively, while retaining an analogous form of the light beam.

BRIEF DESCRIPTION OF DRAWINGS

FIGS. 1, 6, 11, 13, 14 and 16 are schematic views showing the controlling of the size of a light beam according to the present invention.

FIG. 15 is a schematic view showing an arrangement of disks.

DETAILED DESCRIPTION OF THE INVENTION

Figure 1:
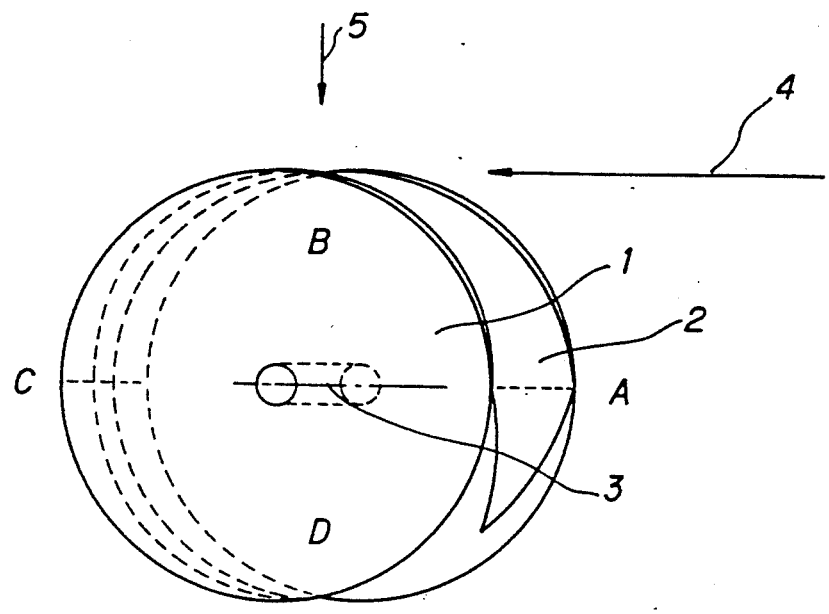

In the method of the present invention, the disk or polygonal-shaped rotor has a groove on the circumferential surface, and the groove is continuously changed in depth and width. The size of a light beam is controlled with one point as a start point according to the form of the groove formed on the circumferential surface of the disk or polygonal-shaped rotor. That is, dots of which the sizes are decreasing or increasing are continuously formed with one point as a start point. When dots, i.e. pixels are arranged in the same manner as in printing, it is preferred to align pixels to form a straight line. For example, when a dot alignment is formed on an electrophotographic photoreceptor of a copying machine, the pulse interval of a light beam is adjusted according to a deviation in the center of the groove form. That is, in the case of a dot having a small size, the pulse interval is increased. In the case of a dot having a large size, the pulse interval is decreased. In the case of writing in a monocolor, an image is not adversely affected even if the centers of pixels are aligned to form a straight line. In the case of writing in full color, centers of the pixels are aligned accurately to form a straight line, whereby an image of an intermediate tone is fully reproduced. When centers of the pixels are not aligned to form a straight line, moire, etc., are liable to occur, and this tendency is particularly outstanding in the case of writing in full color.

In a portion which is irradiated with light beam but is not influenced by the continuous change in the form of the groove (e.g., a portion other than the groove), there may be formed a slit element (gap) which is provided by a slit forming member positioned in place, whereby the final slit consisting of the above slit element and a slit element provided by the groove form is controlled. As a result, the size of the light beam is controlled.

Further, the size of the light beam may be continuously controlled by directing a light beam through a slit formed as follows. A disk or a polygonal-shaped rotor is provided, along the circumferential surface, with a groove of which the size is changed continuously. A plurality of such disks or polygonal-shaped rotors are combined, and the slit is formed of slit members (gaps) of a plurality of the disks or the polygonal-shaped rotors by rotating these disks or polygonal-shaped rotors synchronizingly.

According to the above method, the light beam size is controlled by the slit members (gaps) of a plurality of the disks or the polygonal-shaped rotors, and the center of the slit provided by the slit members is fixed. Therefore, the center of the slit form is not deviated from the straight line direction.

When a laser is used as a light beam source, the center of the irradiation intensity distribution of the light beam is brought into agreement with the center of the slit even without employing means of adjusting the laser pulse interval. As a result, there can be obtained a stable irradiation intensity distribution even if the slit size is continuously changed.

Further, a disk or a polygonal-shaped rotor may be provided with a plurality of grooves along the circumferential surface. In this embodiment, the light beam size can be controlled a plurality of times while the disk or the polygonal-shaped rotor is turned once. As a result, a load on an actuation system which turns the disk or the polygonal-shaped rotor can be reduced, which is especially advantageous when the light beam size is controlled at a high velocity.

When there is a possibility that the controlled light beam is extremely distorted before it reaches an object to be irradiated, the light beam controlling is useless. It is therefore preferable to use sufficiently parallel light beams, and preferred is a light beam from a point light source which is easily optically controlled. As a light source, preferred is a laser which emits nearly nonchromatic light and scarcely causes a chromatic aberration problem.

Further, the pixel having any desired dot alignment can be obtained by synchronizing a laser beam with a rotating disk or polygonal-shaped rotor. In this embodiment, the light beam can be controlled to be on and off at any position of the rotating disk or polygonal-shaped rotor, and any pixel having a desired size can be made. When an alignment of pixels is made by rotating the disk or the polygonal-shaped rotor at a constant rate, it is important to match the time required for positioning the disk or the polygonal-shaped rotor with the time required for positioning an object to be irradiated with the pixel-forming beam. When the light beam is controlled at constant time intervals to be on and off, the time for scanning a predetermined position of the disk or the polygonal-shaped rotor is required to be sufficiently smaller than a time between the irradiation with the light beam and the next irradiation or than the time required for positioning the object to be irradiated.

The present invention will be detailed further by reference to drawings.

FIG. 1 is a schematic view showing a method of controlling a light beam, in which a disk 1 is provided with a groove 2, of which the size is continuously changed, along the circumferential surface, and a light beam 4 is adjusted to any size in a control position 5 by rotating the disk 1 about a rotation axis 3. In FIGS. 1, A, B, C and D indicate typical positions of the groove of which the size is continuously changed. In addition, a slit-forming member to block a light beam above the groove is not shown in FIG. 1.

Figure 2:
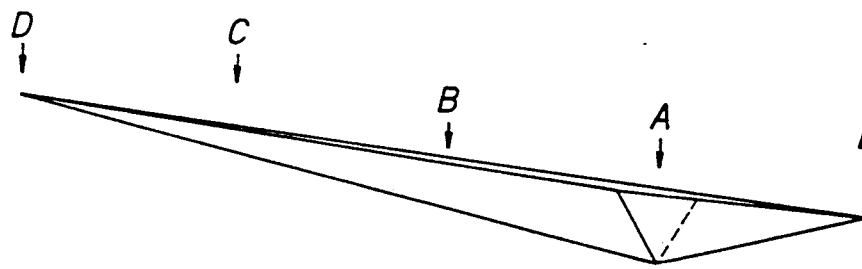
FIGS. 2, 4, 7, 9 and 17 are schematic views of disks or polygonal-shaped rotors used for the method of controlling the size of a light beam according to the present invention.
Figure 4:
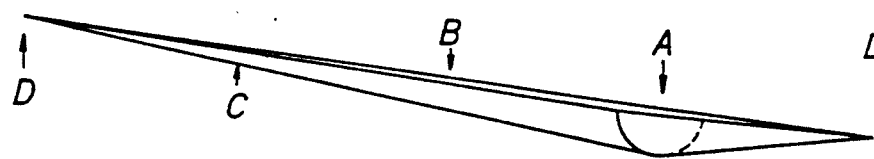

FIGS. 2 and 4 show schematic views showing typical forms (cross-sectionally triangular and semi-circular) of the groove 2 of the disk 1 shown in FIG. 1. In FIGS. 2 and 4, A, B, C and D indicate those positions in the grooves which correspond to A, B, C and D in FIG. 1. When the disk 1 is turned clockwise, the size of the groove changes in the order of A, B, C and D, and the size of a light beam is changed accordingly.

Figure 3:
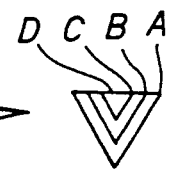
FIGS. 3, 5, 8, 10 and 12 are schematic views showing sizes of a light beam, controlled according to a method of controlling the size of a light beam, provided by the present invention.
Figure 5:
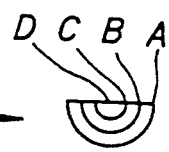

FIGS. 3 and 5 show the steps of a continuous change in size of cross sections of the grooves shown in FIGS. 2 and 4. In particular, the point indicated by D in each of FIGS. 3 and 5 is a substantial control base point, and the form of the cross section of the groove is widened with the above point D fixed. That is, the center of the cross-sectional form shifts downward.

When an object to be irradiated is a photosensitive drum, the position of a light beam source or an object to be irradiated may be corrected by adjusting the light beam pulse interval.

Figure 6:
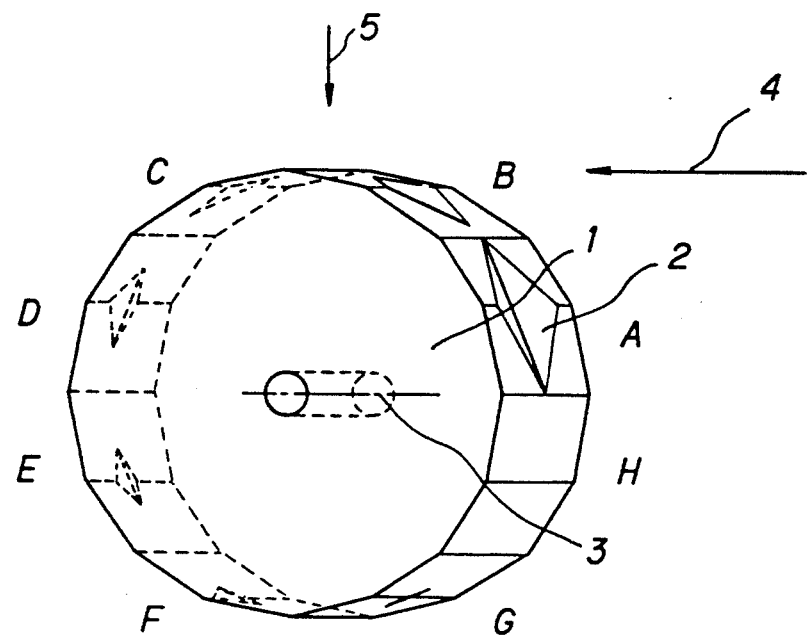

FIG. 6 shows a polygonal-shaped rotor in which grooves having different sizes are formed in the circumferential ridge portions. With this polygonal-shaped rotor, the form of a light beam can be changed stepwise. A slit-forming member to block a light beam above the groove is not shown in FIG. 6, either.

Figure 7:
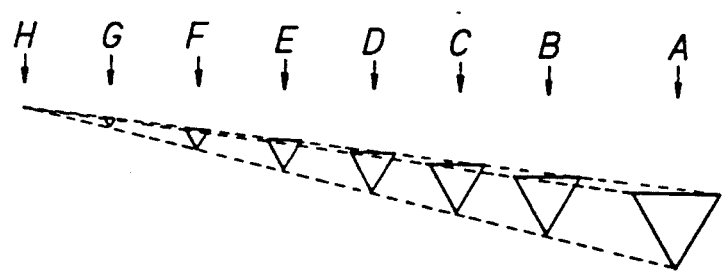
Figure 8:
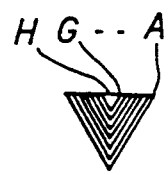
Figure 9:
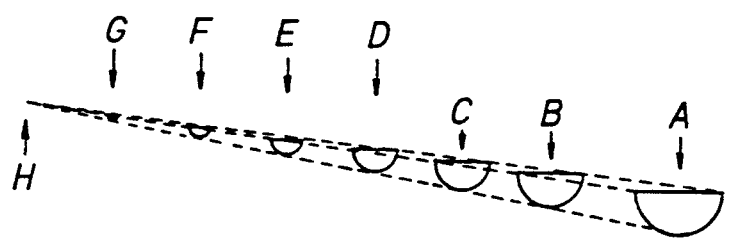
Figure 10:

In FIG. 6, A, B, C, . . . indicate certain positions in a groove. FIG. 7 shows forms of the groove in such positions. FIG. 9 shows a groove having a semicircular form in cross section. FIGS. 8 and 10 show embodiments of controlling the size of a light beam in which the size of a light beam is changed stepwise when the grooves shown in FIGS. 7 and 9 are irradiated with it.

Figure 11:
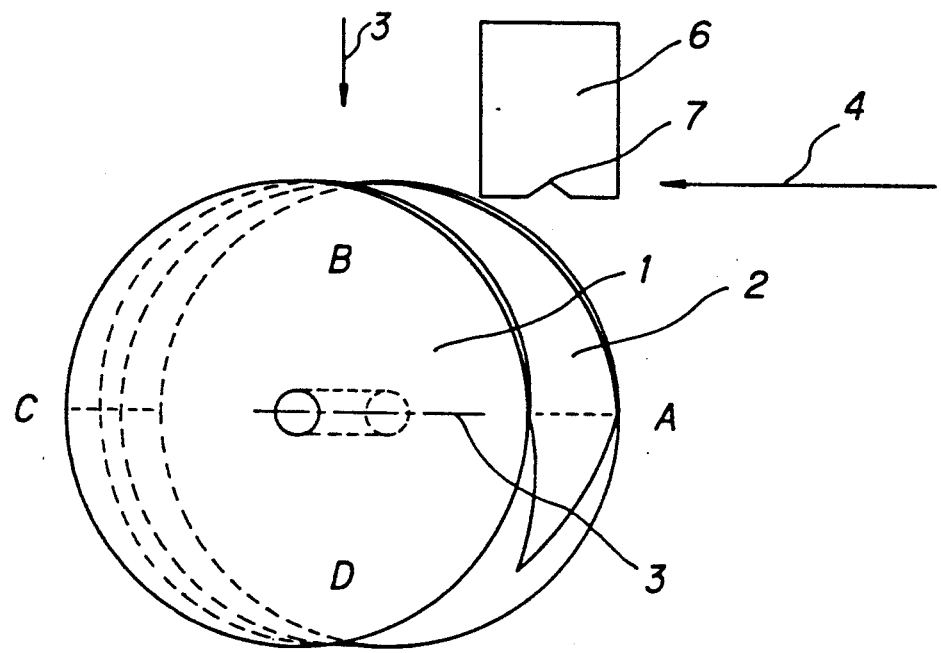

FIG. 11 shows one embodiment for controlling a light beam which passes a portion which is not controlled in FIGS. 1, 6, etc., for example, a portion above the control base point D or H in FIGS. 3, 5, 8 or 10. For that, a slit-forming member 6 is provided.

Figure 12:
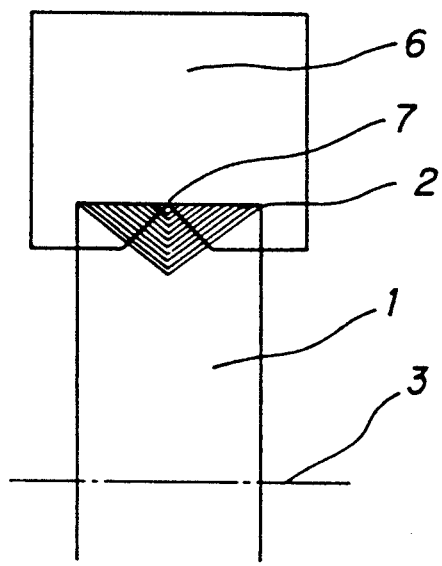

When an apex portion 7 of the slit-forming member 6 is brought into agreement with the control base point D of the groove 2 of the disk 1, the size of a light beam can be continuously controlled with one apex of a quadrilateral figure with a control base point as shown in FIG. 12.

FIGS. 13 and 14 show embodiments in which disks having the same grooves, shown in FIG. 1, are combined symmetrically. The disks positioned on each other are rotated in synchronization. These two disks may be arranged apart from each other along a light path as shown in FIG. 3. The point is that the form of the groove formed by a combination of the disks can be continuously changed with a similar or analogous figure while the control base point and the center of the cross section of the groove are in agreement.

In the above embodiment, the control base point and the center of the cross section of the groove can be brought into complete agreement. Therefore, the above embodiment obviates the procedure for correction of the difference (distance) between the control base point and the center of the cross section of the groove discussed with the embodiment shown in FIG. 1.

Figure 16:
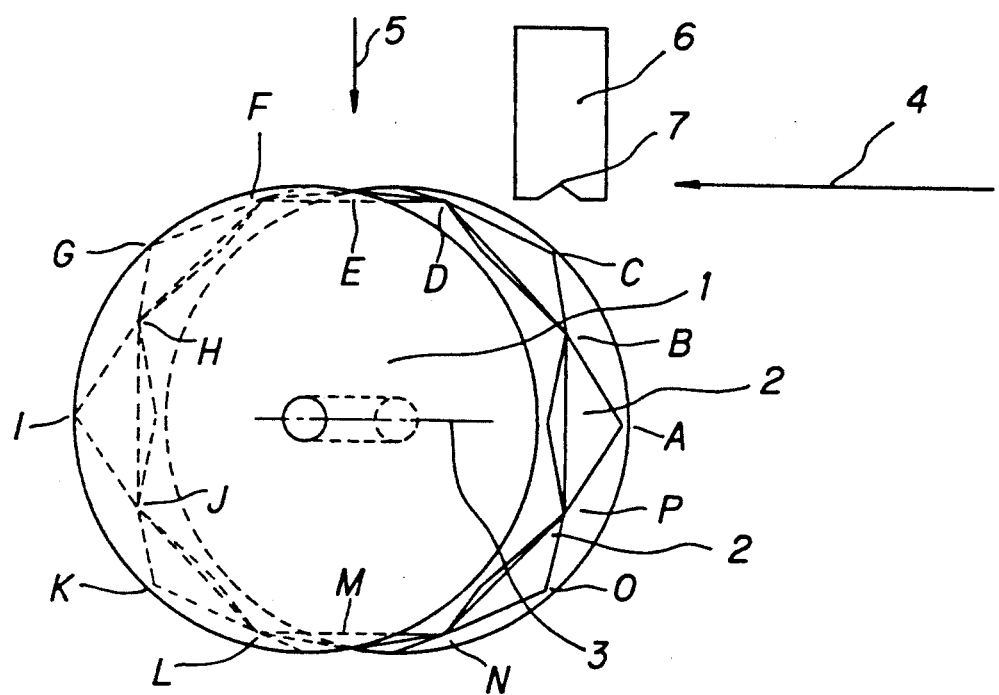

FIG. 16 shows an embodiment in which a plurality of grooves are provided along the circumferential surface.

Figure 17:
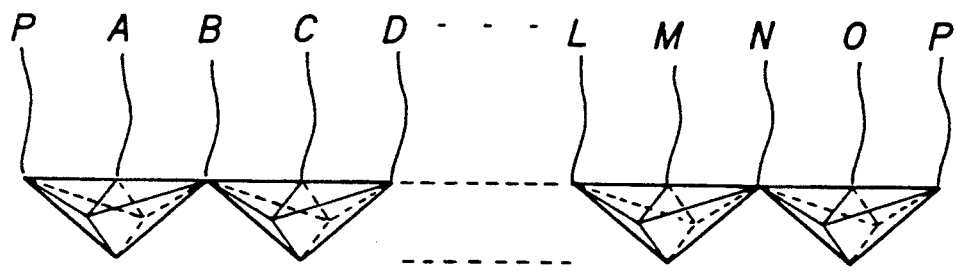

When an apex portion 6 of a slit-forming member 6 and the position of a control base point, B, D, E . . . , P are brought into agreement as shown in FIG. 16, a light beam pattern can be repeated as shown in FIG. 17. The symbols A, B, C . . . , P show repeating positions of nodes, antinodes, . . . of a plurality of the grooves.

It is naturally possible to combine the disks vertically and symmetrically as shown in FIGS. 13 and 14, and bring the control base point and the center of forms into agreement.

In the above method, the size of a light beam can be continuously determined while retaining an analogous form of the light beam. When a light beam pulse is provided at positions of predetermined size, an alignment of dots having a predetermined size can be obtained.

As described above, according to the present invention, the size of a light beam can be continuously and analogously changed, and dots can be reproduced similarly to a conventional dot print method used in the field of a printing plate.

The method of the present invention can be widely applied to printing apparatus is used for image processing with a light beam such as a proof printing machine, a printing plate, a laser beam printer, etc.

What is claimed is:

1. A method of controlling a size of a light beam, which comprises the steps of:

rotating a disk having a plurality of grooves in circumferential ridge portions whose sizes change continuously in a circumferential direction, and irradiating the grooves with a light beam, whereby the grooves provide a transmitted light beam having a size that changes continuously while retaining an analogous form of the light beam.

2. The method according to claim 1, wherein a plurality of disks are rotated and irradiated with a light beam, each disk having a slit element for forming of a part of a form of a light beam which are arranged to control the size of the light beam.

3. The method according to claim 1, wherein the light beam is generated by a laser.

4. The method according to claim 1, wherein the disk is provided with a slit-forming member.

5. The method according to claim 1, wherein the light beam is provided in a pulse form in synchronization with rotation of the disk.

6. A method of controlling a size of a light beam, which comprises the steps of rotating a polygonal-shaped rotor having grooves which have different sizes in circumferential ridge portions, and irradiating the grooves with a light beam, whereby the grooves provide a transmitted light beam having a size that changes stepwise while retaining an analogous form of the light beam.

7. A method according to claim 6, wherein a plurality of polygonal-shaped rotors are rotated and irradiated with a light beam, each rotor having a slit element for forming part of a form of a light beam which are arranged to control the size of the light beam.

8. A method according to claim 6, wherein the light beam is generated by a laser.

9. A method according to claim 6, wherein the polygonal-shaped rotor is provided with a slit-forming member.

10. A method according to claim 6, wherein the light beam is provided in a pulse form in synchronization with rotation of the polygonal-shaped rotor.

* * * * *